(12) United States Patent
Mueller et al.

(10) Patent No.: US 7,704,299 B2
(45) Date of Patent: Apr. 27, 2010

(54) METHODS OF HYDROGEN SULFIDE TREATMENT

(75) Inventors: Frank Mueller, Stavanger (NO); Michael A. Freeman, Kingwood, TX (US); Eric Hand, Katy, TX (US)

(73) Assignee: M-I LLC, Houston, TX (US)

( * ) Notice: Subject to any disclaimer, the term of this patent is extended or adjusted under 35 U.S.C. 154(b) by 569 days.

(21) Appl. No.: 11/677,813

(22) Filed: Feb. 22, 2007

(65) Prior Publication Data

US 2007/0199902 A1 Aug. 30, 2007

Related U.S. Application Data

(60) Provisional application No. 60/776,331, filed on Feb. 24, 2006.

(51) Int. Cl.
*B01D 19/00* (2006.01)

(52) U.S. Cl. .................. 95/8; 95/9; 95/253; 95/258; 95/259; 95/245; 95/261; 95/263

(58) Field of Classification Search .......... 95/8, 95/9, 253, 258, 259, 245, 243, 261, 263; 96/156, 182, 202, 215, 157, 207; 210/241, 210/188

See application file for complete search history.

(56) References Cited

U.S. PATENT DOCUMENTS

| | | | | |
|---|---|---|---|---|
| 4,378,290 | A * | 3/1983 | Kennedy, Jr. ............ | 210/103 |
| 4,474,254 | A * | 10/1984 | Etter et al. ............. | 175/206 |
| 5,035,810 | A * | 7/1991 | Heisel et al. ............ | 210/750 |
| 5,674,312 | A | 10/1997 | Mazzei | |
| 5,730,784 | A | 3/1998 | Smith et al. | |
| 5,928,519 | A * | 7/1999 | Homan .................. | 210/741 |
| 7,282,081 | B2 * | 10/2007 | Verscharen ............. | 95/9 |
| 7,513,934 | B2 * | 4/2009 | Adam et al. ............ | 95/253 |
| 2003/0047309 | A1 | 3/2003 | Thomas et al. | |
| 2003/0047310 | A1 | 3/2003 | Thomas et al. | |
| 2003/0139916 | A1 | 7/2003 | Choe et al. | |
| 2003/0217956 | A1 * | 11/2003 | Mohsen et al. .......... | 210/188 |
| 2004/0026335 | A1 | 2/2004 | Fields | |
| 2004/0168811 | A1 | 9/2004 | Shaw et al. | |
| 2006/0032375 | A1 * | 2/2006 | Verscharen ............. | 95/263 |

(Continued)

OTHER PUBLICATIONS

Notification of Transmittal of The International Search Report and The Written Opinion of the International Searching Authority, or the Declaration dated Aug. 6, 2007 for International Application No. PCT/US2007/005035, (3 pages).

(Continued)

*Primary Examiner*—Duane Smith
*Assistant Examiner*—Douglas J Theisen
(74) *Attorney, Agent, or Firm*—Osha • Liang LLP

(57) ABSTRACT

The present invention provides a method of treating a process fluid that includes assembling a modular system, flowing the process fluid through the modular system, the flowing the process fluid through the modular system including degassing the process fluid, neutralizing the process fluid, reducing an amount of one of the group consisting of entrained gases, oil and solids in the process fluid, monitoring and analyzing the process fluid for at least one of the group consisting of engrained gases, oil, and solids, and flowing the process fluid out of the modular system for disposal.

13 Claims, 8 Drawing Sheets

U.S. PATENT DOCUMENTS

2006/0124524 A1* 6/2006 Duhe et al. ................. 210/188
2006/0272503 A1* 12/2006 Adam et al. ................. 95/253

OTHER PUBLICATIONS

Written Opinion of the International Searching Authority dated Aug. 6, 2007 for International Application No. PCT/US2007/005035, (3 pages).

International Search Report dated Aug. 6, 2007 for International Application No. PCT/US2007/005035, (3 pages).

Non-final Office Action for related U.S. Appl. No. 11/677,800 dated Sep. 9, 2009 (10 pages).

* cited by examiner

METHODS OF HYDROGEN SULFIDE TREATMENT

CROSS-REFERENCE TO RELATED APPLICATIONS

This application, pursuant to 35 U.S.C. §119(e), claims priority to U.S. Provisional Application Ser. No. 60/776,331, filed on Feb. 24, 2006. That application is incorporated by reference in its entirety.

BACKGROUND OF INVENTION

1. Field of the Invention

The invention relates generally to a system for treating process fluids.

2. Background Art

When drilling or completing wells in earth formation, various fluids typically are used in the well for a variety of reasons. As used herein, such fluids will be referred to as "process fluids." Common uses for process fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

In drilling some subterranean formations, and particularly those bearing oil or gas, hydrogen sulfide accumulations are frequently encountered. The drilling fluid brings the hydrogen sulfide to the surface. Such sulfide in the drilling fluid is problematic, as it can corrode the steel in the drilling apparatus and may be liberated into the atmosphere as toxic sulfide gas at the well surface. Further, oil from the drilling fluid (as well as any oil from the formation) maybe become associated with or absorbed to the surfaces of the cuttings that are removed from the formation being drilled. The cuttings may then be an environmentally hazardous material, making disposal a problem.

Generally, to protect the health of those working with the drilling fluid and those at the surface of the well, conditions should be maintained to ensure that the concentration of hydrogen sulfide above the fluid, emitted due to the partial pressure of the gas, is less than about 15 ppm. The partial pressure of hydrogen sulfide at ambient temperatures is a function of the concentration of sulfide ions in the fluid and the pH of the fluid. To ensure that the limit of 15 ppm is not exceeded even for the maximum sulfide concentration that may be encountered in a subterranean formation, the pH of the drilling fluid is typically maintained at a minimum of about 11.5. Also, to prevent the soluble sulfide concentration in the fluid from becoming excessive, action is routinely taken to remove sulfide from the fluid.

Dissolved gases cause many problems in the oil field. Gases and other fluids present in subterranean formations, collectively called reservoir fluids, are prone to enter a wellbore drilled through the formation. In many cases, dense drilling fluids, completion brines, fracturing fluids, and so forth are provided to maintain a countering pressure that restrains the reservoir fluids from entering the wellbore. However, there are many instances where the counter pressure is too low to restrain the reservoir fluids. This may be due to, for example, a miscalculation of the fluid density needed to maintain a hydrostatic overbalance or a transient lowering of pressure due to movement of the drill string in the hole. Gasses may also enter the wellbore through molecular diffusion if there is insufficient flux of fluid from the wellbore to keep it swept away. Finally, reservoir fluids escape from the fragments of the formation that are being drilled up. The reservoir fluid that enters the well is then free to mix with the supplied well fluid and rise to the surface.

The hazards of un-restrained expansions of reservoir fluids in the wellbore are well known. A primary hazard is an avalanche effect of gas evolution and expansion, wherein gas bubbles rise in a liquid stream, expanding as they rise. As the bubbles expand, they expel dense fluid from the bore, and further reduce the hydrostatic pressure of the wellbore fluid. Such a progression may eventually lead to a 'blow out,' whereby so much restraining pressure has been lost that the high pressure reservoir can flow uncontrollably into the wellbore.

Less dramatic, but equally important, are chemical effects that formation fluids may have upon the circulating fluid, the structure of the well, and the associated personnel. These effects and risks may include, for example: methane gas liberated at the surface may ignite; carbon dioxide may become carbonic acid, a highly corrosive compound, when exposed to water; carbon dioxide gas is an asphyxiant; hydrogen sulfide can corrode ferrous metals, particularly in contact with water, and is more damaging than carbon dioxide because it can induce hydrogen embrittlement; embrittled tubulars may separate or break well under design stresses with catastrophic consequences; hydrogen sulfide gas is also toxic, with levels of 800 to 1000 ppm causing death in healthy individuals. Removing dissolved and entrained gases is thus vital to many aspects of successful drilling and exploitation.

Process fluids from wells are typically sent offsite for treatment and processing to remove hazardous materials from the process fluid. For example, gases, such as hydrogen sulfide, solids, for example amounts of earth formation, cuttings, debris, etc., and other fluids, for example oil, may be removed from the process fluid during such processing of the process fluid so that the process fluid may be safely disposed or re-circulated to the well. Sending process fluids offsite may be cumbersome and costly due to the potential risks involved, including health risks for personnel handling the transport of the process fluids and environmental risks of leakage or spillage of the process fluid during transportation.

Accordingly, there exists a need for a system and method for treating a process fluid, including facilitating the reduction of entrained and dissolved gases in the process fluid.

SUMMARY OF INVENTION

In another aspect, the invention relates to a method of treating a process fluid, the method including assembling a modular system, flowing the process fluid through the modular system, the flowing the process fluid through the modular system including degassing the process fluid, neutralizing the process fluid, reducing an amount of one of the group consisting of entrained gases, oil, and solids in the process fluid, monitoring and analyzing the process fluid for at least one of the group consisting of engrained gases, oil, and solids, and flowing the process fluid out of the modular system for disposal.

Other aspects and advantages of the invention will be apparent from the following description and the appended claims.

DETAILED DESCRIPTION

Figure 1:
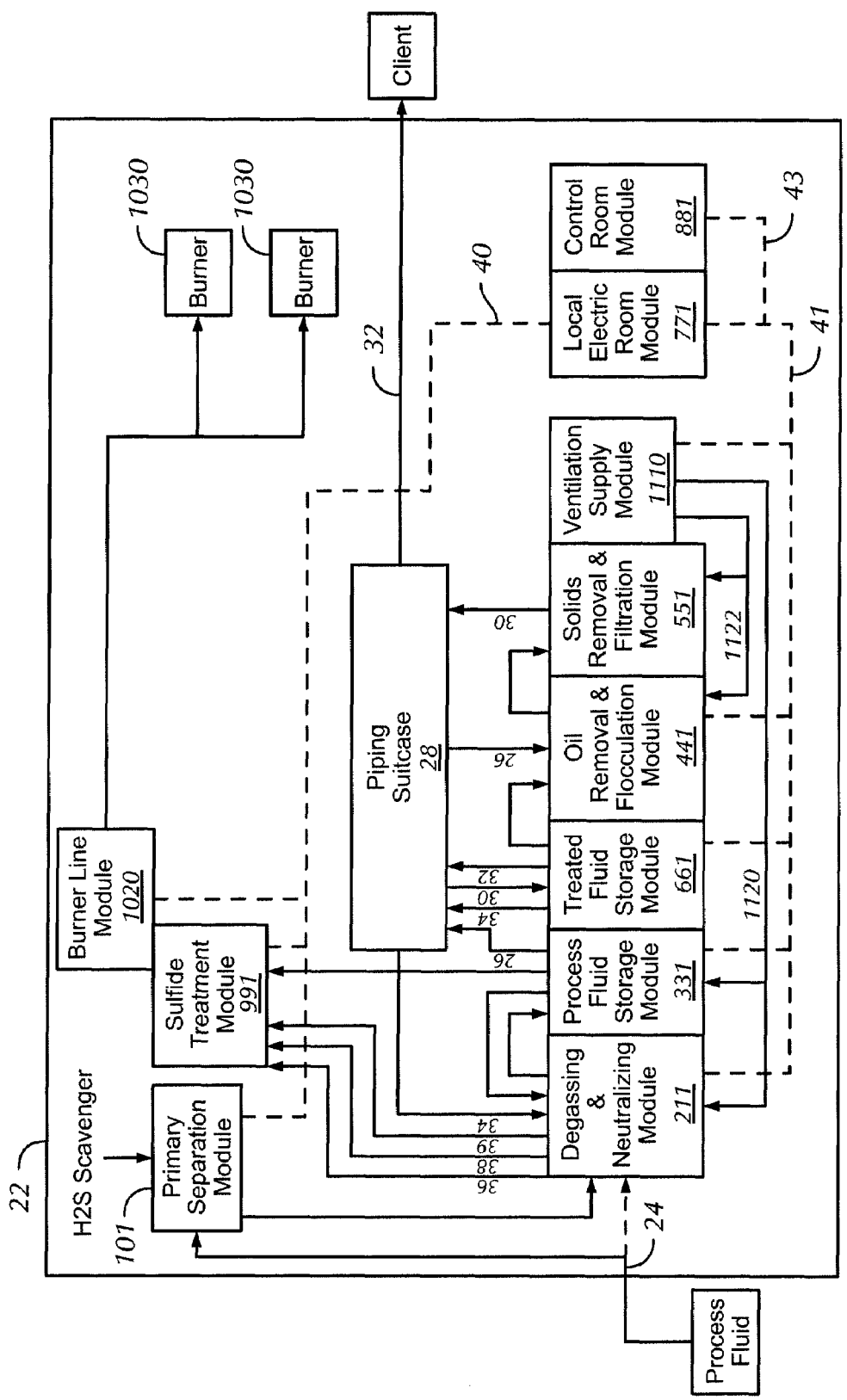
FIG. 1 shows a modular system in accordance with an embodiment of the invention.

In one aspect, embodiments disclosed herein are directed to a system and method for treating process fluids. In another aspect, embodiments disclosed herein are directed to a system and method for removing hydrogen sulfide from process fluids.

As used herein, 'modular system' refers to a grouping of units or modules that are mobile, that may be of a standardized shape and/or size, and that may be interconnected to form a larger system. As used herein, a 'process fluid' refers to any fluid used in drilling or completing a well, including muds, brine, pills, water, etc. As used herein, a 'pill' refers to any relatively small quantity of a blend of drilling fluid that is used to accomplish any specific task that a regular drilling fluid may not accomplish, for example lifting cuttings from the wellbore, dissolve encroaching salt formations, destroy filter cakes, etc. As used herein, 'client' refers to any person, persons, or company that requested the treatment of a process fluid. For example, the client may be an oil company that requested the treatment of process fluid from one or more of its drilling sites. As used herein, 'flocculate,' or 'flocculation,' means to cause to aggregate to form flocs or masses of fine suspended particles. As used herein, a 'hopper' may be defined as a device used to facilitate the addition of process fluid additives or chemicals to a process fluid, wherein the process fluid enters the hopper and mixes with the additives.

Select embodiments disclosed herein include a modular system for treating process fluid on-site. In one embodiment, the system includes multiple mobile modules that may be transported and assembled on-site. In select embodiments, the system receives process fluids used during drilling and processes, or treats, them for disposal. In one embodiment, the system treats process fluids comprising a mixture of water, oil, hydrogen sulfide, brine, dead acid, and a small amount of solids.

Embodiments of the present invention involve a series of interconnected modules comprising a plurality of apparatuses for performing a plurality of processes. Embodiments of the present invention provide a system of mobile, connectable modules for processing or treating a process fluid. Each module is sufficiently small to be mobile and sufficiently large to comprise process equipment, including tanks, valves, pumps, piping, etc. In one embodiment, any of the various modules may be assembled on-site by fitting and/or connecting ladders, guardrails, pipework, electric cabling, and ventilation. Exemplary apparatuses and processes are described below.

Process Overview

After drilling and completion of a well, the process fluids may contain various amounts of entrained gases, oils, and solids. During clean up of a well, process fluids may be treated by flowing the process fluid through a separator and surge tanks. Depending on the water and solids content, oil may be delivered to a burner, or returned to the separator. Gases removed from the process fluid in the separator may be sent to a burner. Fluids used during the clean up phase of a well include volumes of fluids from the tubing volume or brine, pills, and water used to wash equipment at the end of a test or stimulation program. Process fluids used during drilling and completion of a well may contain various amounts of hydrogen sulfide gas that may vary from a few parts per million (ppm) to over 10,000 ppm.

After stimulation of the well, additives, such as acid and chemical mixtures, associated with the drilling process are flowed back or returned to the surface. These additives may include surfactants, corrosion inhibitors, iron control agents, and solvents. The effectiveness of the acid and the chemicals during the drilling process depends on the well conditions and the estimated area of the reservoir formation. Part of the acid and other fluid components may not be completely consumed when returned to the surface and must be neutralized for safe disposal.

In one embodiment, a system for treating process fluid, including removal of hydrogen sulfide, is shown in FIG. 1. Process fluid enters 24 the modular system for treating 22 a process fluid wherein the process fluid is processed and treated for safe disposal of the process fluid. In one embodiment, the modular system 22 comprises a plurality of modules, wherein the size of each module is sufficiently small to be mobile. Accordingly, the modules may be assembled on-site. In one embodiment, the modules have approximate dimensions of about 20 ft in length and 8 ft in width. One of ordinary skill in the art, however, will appreciate that any size module that is sufficiently small to be mobile and sufficiently large to house tanks, pumps, and process equipment may be used without departing from the scope of the invention. In one embodiment, the modular system 22 may be configured to treat process fluids that comprise a mixture of water, oil, hydrogen sulfide, brine, dead acid, and solids.

In one embodiment, a process fluid enters 24 the modular system 22 and first enters a primary separation module 101. The primary separation module 101 may be used for coil tubing drilling application and generally not during normal operation with acid flow backs. The primary separation module 101 may remove gas and solids from the process fluid. Additionally, the primary separation module 101 may provide an interface between high pressure and low pressure operation, in the event equipment upstream from the system 22 fail to limit high pressure to the system 22. After the process fluid flows through the primary separation module 101, thereby removing entrained gas and solids, the process fluid may be pumped to the degassing and neutralizing module 211. In an alternate embodiment, process fluid may enter 24 the modular system 22 from a client and enter the degassing and neutralizing module 211, without first entering the primary separation module 101.

In this embodiment, a degassing and neutralizing module 211 comprises a tank having a degassing compartment (213 in FIG. 3) that reduces the amount of dissolved and entrained hydrogen sulfide gas from the process fluid and a neutralizing compartment (214 in FIG. 3) that monitors and adjusts the pH of the process fluid. The process fluid may then be pumped to the process fluid storage module 331.

Figure 4:
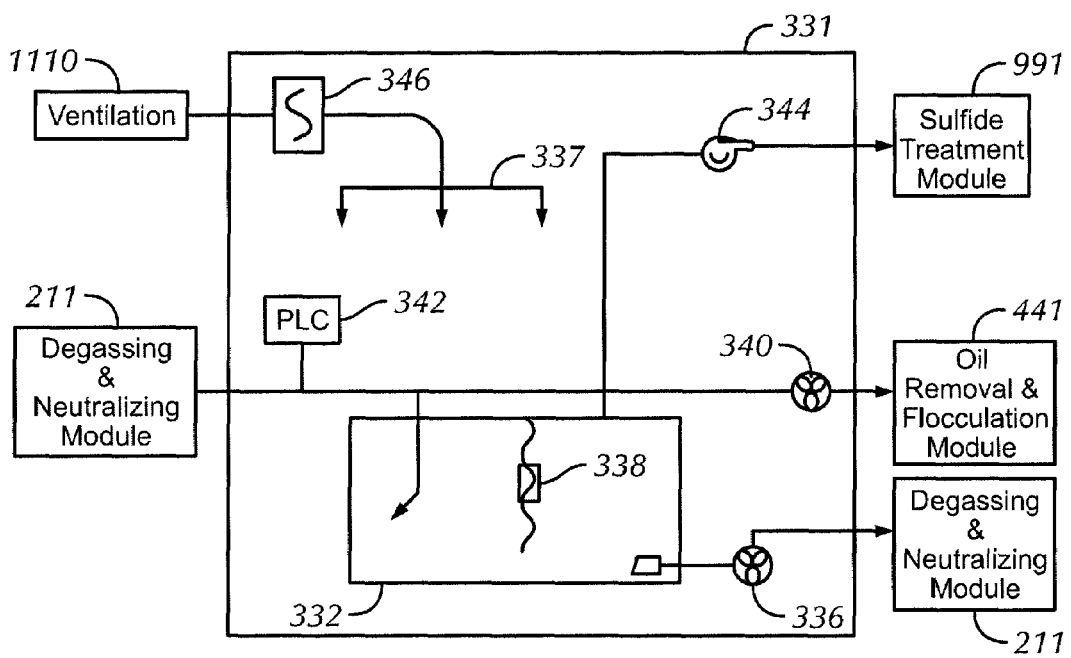
FIG. 4 shows a process fluid storage module in accordance with an embodiment of the invention.

In this embodiment, a process fluid storage module 331 comprises a storage tank (332 in FIG. 4). Process fluid from the degassing and neutralizing module (221) having more than a pre-selected value of hydrogen sulfide is flowed into the storage tank (332 in FIG. 4) in the process fluid storage module 331. Process fluid stored in the process fluid storage module may then be returned to the degassing and neutralizing module 211 for further processing. If the process fluid from the degassing and neutralizing module (221) has less than pre-selected value of hydrogen sulfide, then the process fluid is sent 26 from the process fluid storage module 331 through a piping suitcase 28 to the oil removal and flocculation module 441.

In this embodiment, an oil removal and flocculation module 441 comprises a coalescing tank (442 in FIG. 5) for the removal of oil from a process fluid and a flocculation tank (451 in FIG. 5) for process fluid flocculation. Recovered oil from the coalescing tank may be sent to an IBC for storage or piped directly to the client. After the process fluid flows through the coalescing tank and the flocculation tank, the process fluid may be transferred to the solids removal and filtration module 551.

Figure 6:
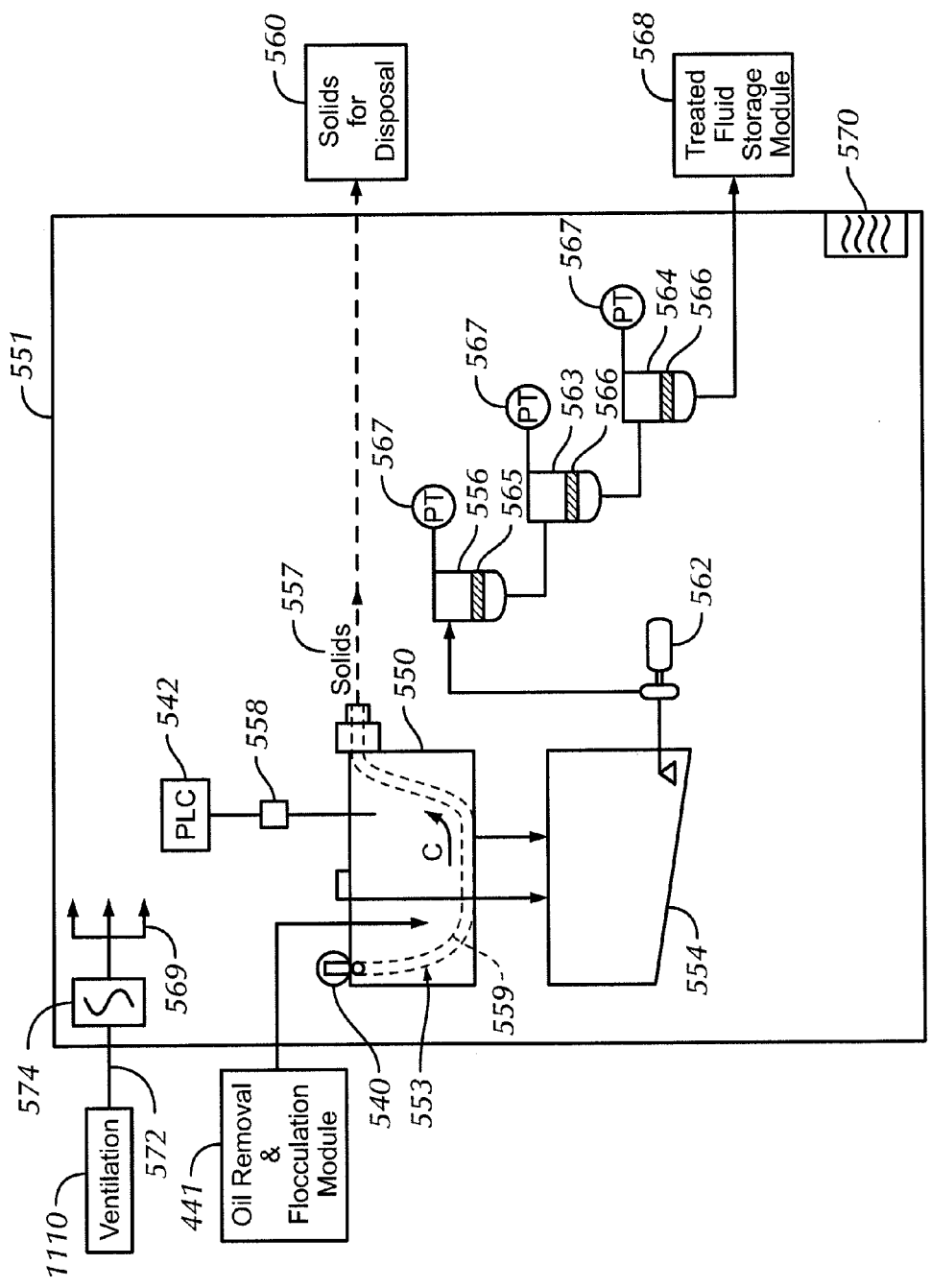
FIG. 6 shows a solids removal and filtration module in accordance with an embodiment of the invention.

In this embodiment, a solids removal and filtration module 551 comprises a belt filter (553 in FIG. 6 for removing solid material from a process fluid coupled to a storage tank (554 in FIG. 6). In one embodiment, at least one filter canister may be coupled to the storage tank 554. Process fluid from the solids removal and filtration module 551 may then be pumped through the piping suitcase 28 to the treated fluid storage module 661, as indicated by the process flow arrows 30.

In this embodiment, a treated fluid storage module 661 comprises an oil-in-water monitoring system (663 in FIG. 7) for measuring the concentration of oil within a treated process fluid entering the treated fluid storage module 661 from the solids removal and filtration module 551 and a tank (664 in FIG. 7) for storing the treated process fluid. The process fluid stored in the treated fluid storage module 661 may be sent 32 to the client as treated process fluid. Additionally, the process fluid stored in the treated fluid storage module 661 may be re-circulated 34 to the degassing and neutralizing module 211 for tank cleaning or reprocessing, or sent to the oil removal and flocculation module 441 for further processing.

Figure 8:
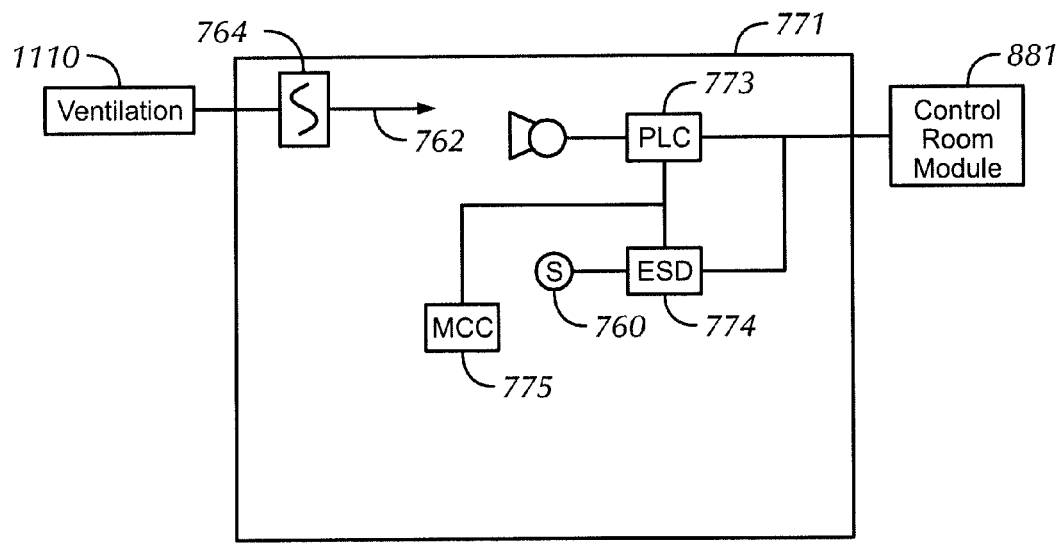
FIG. 8 shows a local electric room module in accordance with an embodiment of the invention.

In this embodiment, a local electric room module 771 is electrically connected to each of the various modules, as indicated by the dashed lines 40 and 41. In this embodiment, the local electric room comprises a hydrogen sulfide PLC system 773, a F&G/ESD system 774, and a MCC 775 (FIG. 8). The local electric room module 771 houses the system and equipment responsible for controlling the intermodular processes and the processes within each module. The hydrogen sulfide PLC system may control the system process, the F&G/ESD system may control the process for shutting down the system safely should a serious process condition occur, and the MCC controls the motor power for the system.

In this embodiment, a control room module 881 is electrically connected 43 to at least one of they systems, including the hydrogen sulfide PLC system 773, the F&G/ESD system 774, and the MCC 775 (FIG. 8), disposed in the local electric room module 771. The control room module 881 may be disposed on top of the local electric room module 771 and may comprise an operator work station and a system laboratory. The control room module 881 may comprise a hydrogen sulfide PLC HMI and a hydrogen sulfide PLC server, thereby providing an operator with a graphical interface of the processes of the modular system 22. In one embodiment, the graphical interface may display the modular system 22, in P&ID format.

In this embodiment, a sulfide treatment module 991 comprises a tank 994 that contains a consumable medium that chemically reacts with a sour gas stream that enters the sulfide treatment module 991 from the mechanical degasser 220 (FIG. 3) in the degassing and neutralizing module 211, as indicated by process flow arrow 36, the degassing compartment 213 of the degassing and neutralizing module 211, as indicated by process flow arrow 38, the neutralizing compartment 214 of the degassing and neutralizing module 211, as indicated by process flow arrow 39, and/or the process fluid storage module 331 to convert hydrogen sulfide into a safe material for disposal. The processed gas stream may then be extracted and sent to the burner line module 1020.

Figure 11:
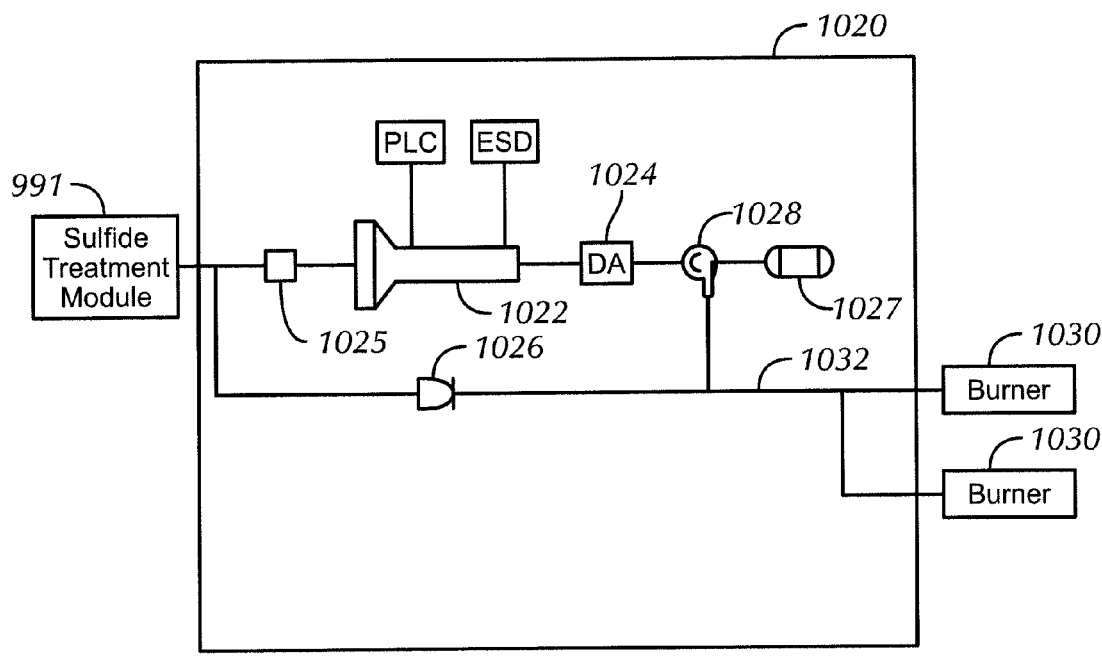
FIG. 11 shows a burner line module in accordance with an embodiment of the invention.

In this embodiment, a burner line module 1020 extracts gases from the sulfide treatment module 991 and delivers the gases to the a burner system. In one embodiment, the burner system may comprise at least one burner 1030. The burner line module comprises a hydrogen sulfide gas detection system 1025, a particulate filter 1022, a detonation arrestor 1024, a rupture disc 1026, and a centrifugal blower 1028 (FIG. 11).

Figure 12:
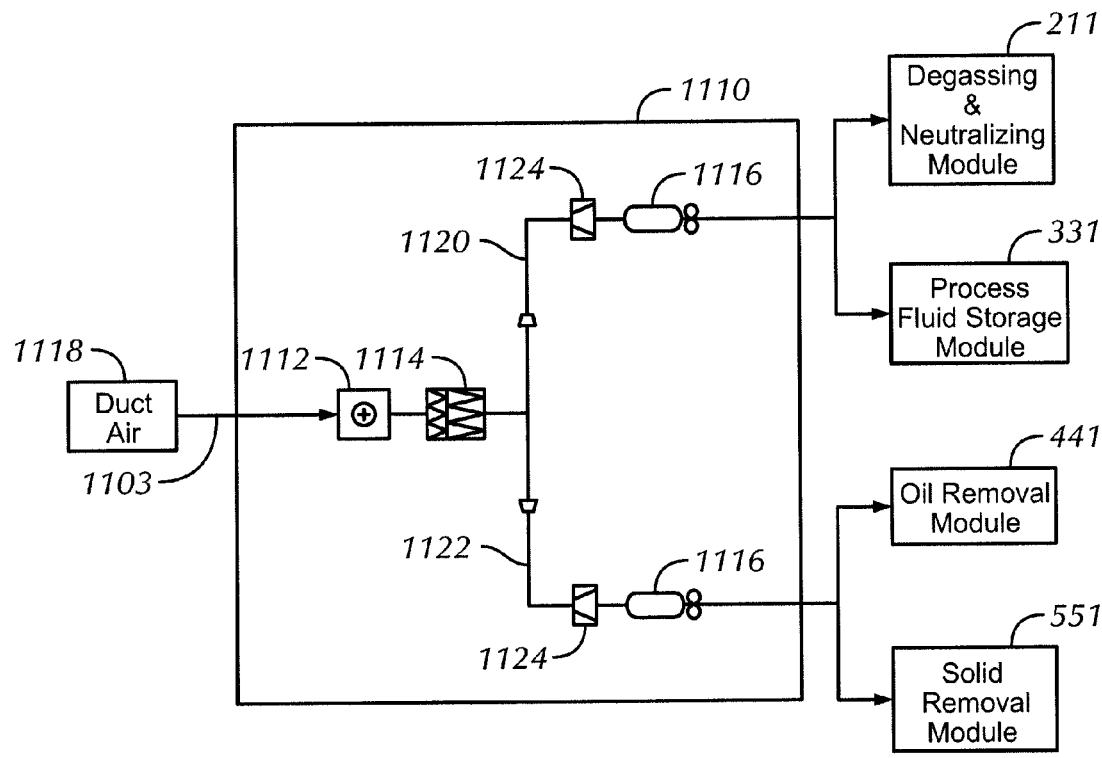
FIG. 12 shows a ventilation supply module in accordance with an embodiment of the invention.

In this embodiment, a ventilation supply module 1110 supplies ventilation air to at least one of the modules of the modular system 22. The ventilation supply air may be ducted from an elevation of approximately 10 ft above the control room module 881. In one embodiment, the ventilation supply module 1110 may be disposed on top of the solids removal and filtration module 551. The ventilation supply module 1110 may comprise isolation dampeners 1124, an air heater 1112, a coalescing filter 1114, and an axial blower 1116 (FIG. 12). The ventilation supply module 1110 passes supply air through a heater and a coalescing filter and then separates into two supply systems. A first system 1120 may supply air by insulated ducting to the degassing and neutralizing module 211 and process fluid storage module 331. A second system 1122 may duet supply air to the oil removal and flocculation module 441 and the solids removal and filtration module 551.

In this embodiment, a piping suitcase 28 allows easy connection of piping for the system and for module interconnections. In one embodiment, the piping suitcase 28 may include a plurality of pipes, connections, and inline process equipment that allows a module to be coupled to another module by coupling each module to the piping suitcase 28.

Equipment that may not exposed to corrosive fluids, including, for example, tanks, inline process equipment, piping, flanges, etc., may be constructed of carbon steel with the surfaces prepared and coated.

Structural equipment, for example lifting frames, may be constructed of low temperature carbon steel, surface prepared and coated. Bulkheads may be constructed of carbon steel, surface prepared and coated. Fire rated bulkhead insulation material may be A-60 fire rated. Non-fire rated bulkhead insulation material may be fire and moisture resistant.

Primary Separation Module

Figure 2:
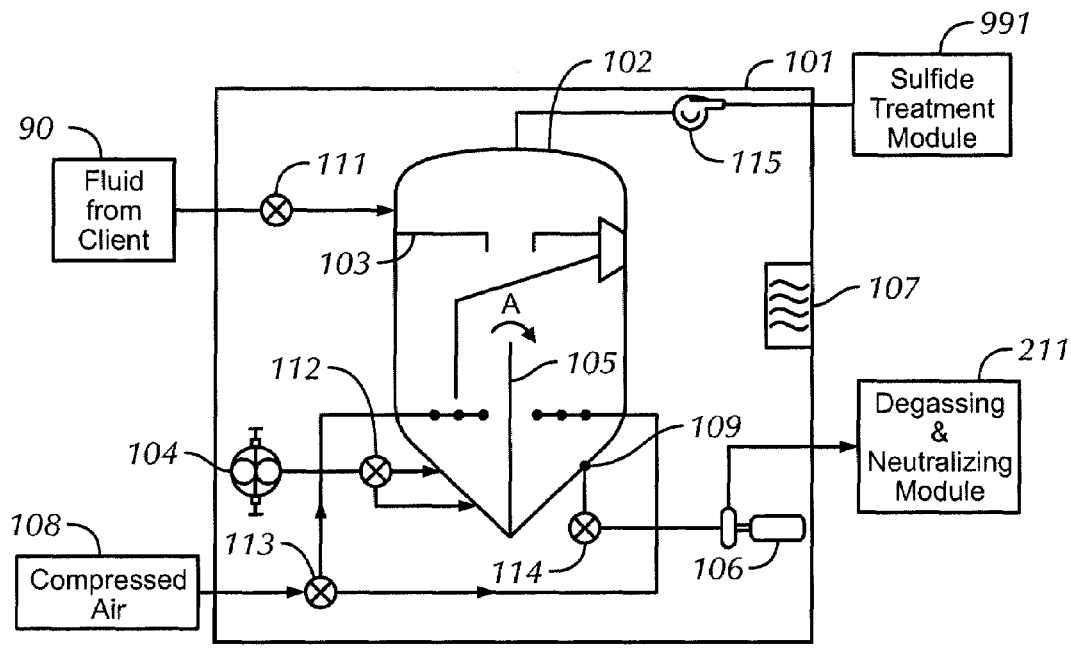
FIG. 2 shows a primary separation module in accordance with an embodiment of the invention.

FIG. 2 shows a primary separation module 101, as may be optionally used in one embodiment to reduce the amount of gas and solids entrained in a process fluid. For example, in one application, the primary separation module 101 may be used for coil tubing drilling applications. In another example, a primary separation module 101 is not used during normal operation with acid flow backs. In present in the process, the primary separation module 101 comprises a tank 102 for storing a process fluid. In one embodiment, the tank 102 may be a cyclone separator. The primary separation module 101 may further comprise separation baffles 103 disposed inside the tank 102 over which the process fluid flows, thereby releasing entrained gases in the process fluid. A pump 104, for example a diaphragm pump, may be coupled to the tank 102 to inject a hydrogen sulfide scavenger material into the process fluid to remove entrained hydrogen sulfide. For example, copper, zinc, or iron compounds may be added to the process fluid to react with and sequester hydrogen sulfide. One of ordinary skill in the art will appreciate that there are numerous scavenger materials known in the art that may be used to react with and sequester entrained hydrogen sulfide. A blower may be coupled to the tank to extract gases, for example, to extract hydrogen sulfide, released from the process fluid during the primary separation. Actuated valves may be coupled to the blower and the tank 102 to regulate the gas that is removed from the primary separation module 101 and to regulate replacement air flowed into the tank 102. Additionally, a weir arrangement 105 configured to separate solids from the process fluid may be disposed inside the tank 102. A transfer pump 106 may be coupled to the tank 102 to transfer the process fluid treated in the primary separation module 101 to another module, such as the degassing and neutralizing module 211 (described in more detail below with reference to FIG. 3). In one embodiment, the transfer pump 106 may be a centrifugal pump. A system of valves 111, 112, 113, and 114 may be coupled to the tank 102 to control the flow of the process fluid and chemicals. In one embodiment, the primary separation module 101 may be ventilated by at least one louver 107, that may be fixed or variable.

Figure 10:
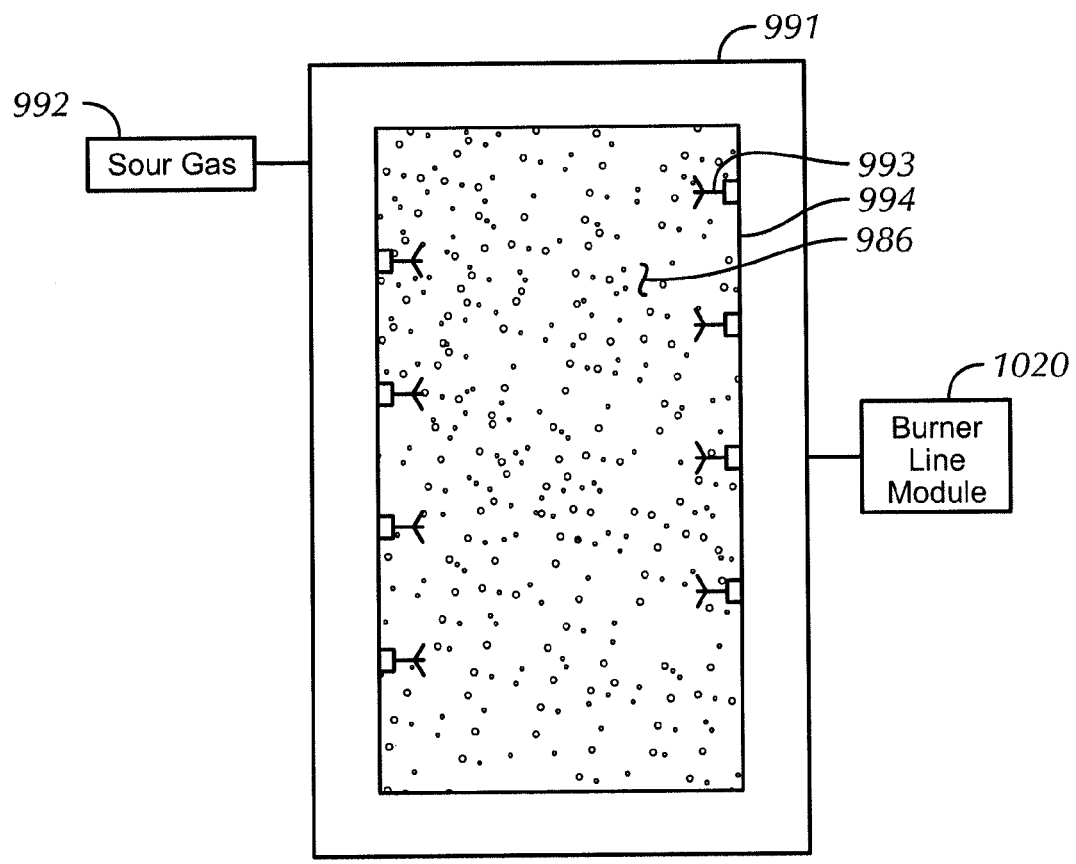
FIG. 10 shows a sulfide treatment module in accordance with an embodiment of the invention.

In one embodiment, as shown in FIG. 2, process fluid from the well or a client 90 enters tank 102. The shape of the tank 102 and the movement of the fluid inside the tank 102 provide a hydro cyclonic effect on the process fluid to facilitate separating entrained gases from the process fluid. Additionally, gas may be separated from the process fluid as the process fluid strikes the inside wall of the process tank 102 and as the process fluid flows over the separation baffles 103 disposed inside the tank 102. Hydrogen sulfide scavenger material may be injected into the process fluid in the tank through a diaphragm pump 104 to react with and sequester the hydrogen sulfide. Additionally, compressed air 108 may be injected into the process fluid in the tank 102 to cause an additional amount of entrained hydrogen sulfide to be released from the process fluid. In one embodiment, reactions between the scavenger material and hydrogen sulfide and/or compressed air and hydrogen sulfide may result in elemental sulfur. The elemental sulfur may then settle to the bottom of the tank 102. Additionally, entrained hydrogen sulfide released from the process fluid may be extracted from the tank 102 by a blower 115 and transferred to a sulfide treatment module 991 (FIG. 10).

In one embodiment, the process fluid flows (indicated at A) through a weir arrangement 105 in tank 102. The weir arrangement 105 separates solid materials from the process fluid. The solid materials separated by the weir arrangement may settle to the bottom of the tank 102. The process fluid may then flow over the weir arrangement and exit the tank at an outlet 109. The process fluid may then be exported by a transfer pump 106 to a degassing and neutralizing module 211 for further processing.

Degassing & Neutralizing Module

Figure 3:
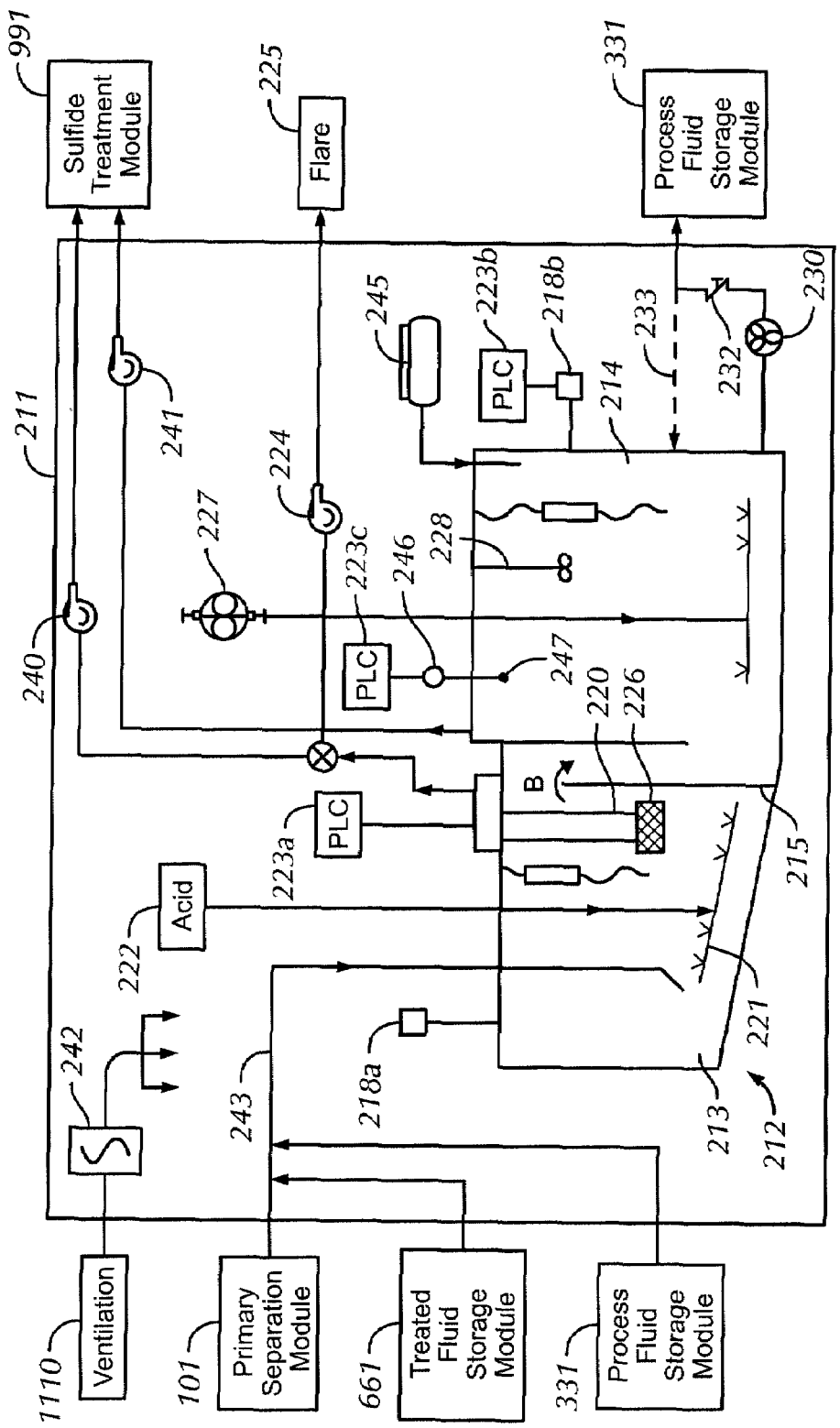
FIG. 3 shows a degassing and neutralizing module in accordance with an embodiment of the invention.

One embodiment of a degassing and neutralizing module 211 is shown in FIG. 3. The degassing and neutralizing module 211 is configured to reduce the amount of dissolved and entrained gases from a process fluid. In one embodiment, the process fluid entering the degassing and neutralizing module may be process fluid from another module, for example, the primary separation module 101. The degassing and neutralizing module 211 comprises a tank 212 having a first compartment and a second compartment separated by a weir arrangement 215. In one embodiment, a first compartment, or degassing compartment 213, reduces the amount of dissolved and entrained hydrogen sulfide gas in the process fluid and a second compartment, or neutralizing compartment 214, adjusts the pH of the process fluid. In one embodiment, the degassing and neutralizing module 211 may be coupled to a ventilation supply module 1110 (described in more detail below with reference to FIG. 12) for ventilation of the degassing and neutralizing module 211. While the degassing and neutralizing processes described herein are disposed in one module, the degassing and neutralizing module 211, one of ordinary skill in the art will appreciate that these two processes may be disposed in separate modules, so long as each module is sufficiently small to be mobile and each module may be connected to another module for assembly on-site.

In one embodiment of a method for using a system having a degassing and neutralizing module 211, the degassing and neutralizing module 211 is purged prior to operating the degassing and neutralizing module 211. For example, the degassing and neutralizing module 211 may be purged for a few minutes, such as approximately ten minutes, prior to operation. Ventilation air may be supplied to the degassing and neutralizing module from a ventilation supply module 1110. In one embodiment, ventilation air is flowed through the degassing and neutralizing module 211. The ventilation air flow may be regulated so that up to twelve air changes or more are performed per hour within the degassing and neutralizing module 211. Additionally, the ventilation air may be extracted at a higher rate than the supply rate to maintain a negative module pressure that reduces the risks of leakage to the outside. In one embodiment, the ventilation air may be extracted at 20 percent above its supply rate. In some embodiments, the degassing compartment 213 and the neutralizing compartment 214 may be ventilated at up to 30 air changes or more per hour. In one embodiment, the air is changed often enough so that the air/gas ratio is maintained below the Lower Limit (LEL). The ventilated air from the degassing compartment 213 and the neutralizing compartment 214 may be extracted by blower 240 and air from the mechanical degasser may be extracted by blower 241. The extracted air may be vented to another module, for example, a sulfide treatment module 991 (as described in more detail below with reference to FIG. 10), wherein hydrogen sulfide may be removed from the extracted gas. In the event of an Emergency Shut Down (ESD), isolation dampeners 242 may close, thereby preventing ventilation air from entering or exiting the degassing and neutralizing module 211.

Degassing Compartment

In one embodiment, process fluid is flowed at 243 from any of a number of possible sources, for example, the primary separation module 101, a treated fluid storage module 661 (described in more detail below with reference to FIG. 7), and/or a process fluid storage module 331 (described in more detail below with reference to FIG. 3), into a degassing compartment 213, wherein the amount of entrained and dissolved gases, such as hydrogen sulfide, in the process fluid may be reduced. In one embodiment, the degassing compartment 213 comprises a pH analyzer 218a that monitors the pH of the process fluid in the degassing compartment 213. The degassing compartment 213 further comprises a mechanical degasser 220. The process fluid passes through the mechanical degasser wherein centrifugal force is exerted on the well fluid. The centrifugal force of the mechanical degasser multiplies the force acting on the entrained gas bubbles, for example, hydrogen sulfide, to increase buoyancy of the gas bubbles, thereby releasing an amount of entrained gas bubbles from the well fluid. The increase in buoyancy of the gas bubbles accelerates the bubble-rise velocity. As the bubbles rise toward the surface, they escape the process fluid. One of ordinary skill in the art will appreciate that any device known in the art that will exert a centrifugal force on the fluid, thereby reducing the amount of entrained or dissolved gases in the process fluid may be used in place of a mechanical degasser. The degassing compartment 213 may further include means 221 for aerating the process fluid to enhance the removal of entrained gas bubbles. One example of a degassing compartment 212 with means 221 for aerating the process fluid that may be used in accordance with embodiments of the present invention is described in a co-pending, co-owned U.S. Patent Application Ser. No. 60/776,372 titled "Aerated Degasser," filed simultaneously with the present application which is incorporated by reference herein, in its entirety.

In one embodiment, a process fluid enters a degassing and neutralizing module 211, first entering a degassing compartment 213. The process fluid pours into the degassing compartment 213 until it reaches a pre-selected depth corresponding to a pre-selected volume. For example, in one embodiment, the pre-selected depth corresponds to a volume of approximately two hundred cubic feet (about 6 m$^3$) of process fluid. A pH analyzer 218a monitors the pH of the process fluid. The pH of the process fluid may be measured by any method known in the art, and is not limited herein. If the process fluid has a pH greater than 4, then acid may be added, shown at 222, to the process fluid until a pH of less than 4 is reached. In one embodiment, the pH of the process fluid is maintained between 3.0 and 3.5. In one embodiment, the acid added to the process fluid to maintain the pH may be citric acid. One of ordinary skill in the art will appreciate that other acids may be used to lower and maintain the pH of the well fluid.

One commercially available degasser that may be useful in this application is a MI SWACO® CD-1400, available from M-I, LLC (Houston, Tex.). The mechanical degasser 220 may be coupled to the degassing compartment 213. Process fluid passes through the mechanical degasser 220 wherein a centrifugal force is exerted on the process fluid to facilitate removal of entrained gases from the process fluid. The mechanical degasser 220 may be controlled by a programmable logic controller (PLC) 223a that activates the mechanical degasser 220 once the level of process fluid in the degassing compartment 213 reaches a predetermined level for safe operation of the mechanical degasser 220. A blower 240, 224 may be coupled to the mechanical degasser 220 to extract gas removed from the process fluid. In one embodiment, entrained gases may removed and sent to a sulfide treatment module 991 or to a flare 225 for burning.

In one embodiment, an aeration device 221 may be disposed in the degassing compartment 213 that injects or sparges compressed air into the process fluid. The compressed air may react with dissolved or entrained hydrogen sulfide in the process fluid thereby producing elemental sulfur. Elemental sulfur may then be more easily separated from the process fluid. One example of sparging a process fluid with compressed air that may be used, in accordance with embodiments of the present invention, is described in U.S. Patent Application Ser. No. 60/776,372 titled "Aerated Degasser," filed simultaneously with the present application which has been incorporated by reference herein, in its entirety. In one embodiment, the aeration device 221 may comprise a septum or membrane having small perforations through which air is sparged. The membrane may be flexible, such as a woven or non-woven fabric, or a sheet of rubber or other elastomer with perforated openings cast or otherwise formed therethrough. Alternatively, the membrane may be rigid, for example a solid fit, which is a body of sintered particles with fine openings between particles, or a metal surface with fine perforations, or openings devised by any means known in the art. One of ordinary skill in the art will appreciate, however, that the membrane may be constructed of any of a number of materials known in the art that resist deterioration in the process fluid and formed such that air may be sparged through the membrane and into the fluid.

In one embodiment, the aeration device may be disposed proximate the intake 226 of the mechanical degasser 220. The mechanical degasser may be run simultaneously with the aeration device. In this embodiment, the centrifugal force of the mechanical degasser 220 multiplies the force acting on the entrained gas bubbles and air bubbles to increase buoyancy and release of both the entrained gas bubbles and the air bubbles. The increase in buoyancy of the bubbles accelerates the bubble-rise velocity. As the entrained gas bubbles and the oxygen bubbles rise toward the surface, they escape the well fluid. As the process fluid level in the degassing compartment 213 rises above a pre-selected depth of contained process fluid due to the input flow of process fluid into the degassing compartment 213 and the sparged air, the contained process fluid flows, as shown at B, through a weir arrangement 215 in the degassing and neutralizing module 211 into the neutralizing compartment 214.

Neutralizing Compartment

In one embodiment, process fluid from the degassing compartment 213 flows into a neutralizing compartment 214, wherein the process fluid is sampled and tested for the presence of hydrogen sulfide. In one embodiment, the neutralizing compartment 214 comprises a pH analyzer 218b for measuring the pH of the process fluid. In this embodiment, the neutralizing compartment 214 further comprises at least one pump 227, for example a diaphragm pump, that may supply chemicals for adjusting the pH of the process fluid. Additionally, the neutralizing compartment 214 comprises fluid samplers 247 that extract samplings of the process fluid for testing. In this embodiment, the neutralizing compartment 214 further comprises a dissolved sulfide analyzer or monitor 246. In one embodiment, a dissolved sulfide monitor 246 may be used to measure the sulfides in solution in the process fluid. In this embodiment, the sulfides in the process fluid may be monitored continuously with minimal maintenance and adjustment. Those having ordinary skill in the art will appreciate that monitoring may also occur on a non-continuous basis. Variable speed driven pumps 245 and static mixers 228 coupled to the neutralizing compartment 214 inject hydrogen scavenger material into the process fluid. The neutralizing compartment 214 further comprises a transfer pump 230 for transferring process fluid to another module, such as a process fluid storage module 331 (described in more detail below with reference to FIG. 4).

In one embodiment, process fluid flows, shown at 13, over the weir arrangement 215 from a degassing compartment 213 to a neutralizing compartment 214. In this embodiment, the pH of the process fluid is measured and monitored by a pH analyzer 218*b* controlled by a hydrogen sulfide PLC 223*b*. The pH of the process fluid may be adjusted to a predetermined pH value. In one embodiment, the predetermined pH value may be a minimum of 6. Chemicals may be added to the process fluid via pumps 227 to adjust the pH of the process fluid. In one embodiment, for example, a basic material such as caustic soda, may be added to the process fluid to raise the pH of the process fluid. Alternatively, an acidic material such as citric acid, may be used to lower the pH of the process fluid in the neutralizing compartment 214.

In one embodiment, fluid samplers 247 may be coupled to the neutralizing compartment 214 for extracting samples of process fluid. For example, a fluid sampler sold under the trademark Jiskoot 210P available from Jiskoot, London, England may be used. One of ordinary skill in the art will recognize that any sampler may be used such that the sampler extracts accurate sampling of fluid from the process fluid for testing. Multiple samples may be collected and tested for hydrogen sulfide. In one embodiment, four samples are extracted and tested. Each sample may be automatically fed into a dissolved sulfide monitor 246, for example, an ATI Model A15/81 dissolved sulfide monitor available from Analytical Technology, Inc., Collegeville, Pa., and mixed with an acid. In one embodiment, the sample is mixed with sulfuric acid. Within the dissolved sulfide monitor 246, the sample and acid mixture flow into a chamber wherein hydrogen sulfide is stripped from the sample. A sensor disposed in the dissolved sulfide monitor 246 is located in a gas stream of the sample and measures a release of hydrogen sulfide concentration. In the dissolved sulfide monitor 246 of this embodiment, the sensor does not come into contact with the sample, but rather the gas stream that contains the stripped hydrogen sulfide contacts the sensor. The sensor sends the measurement results to a hydrogen sulfide PLC 223*c*.

During the sampling process, hydrogen sulfide scavenger material may be injected into the process fluid. In one embodiment, hydrogen sulfide scavenger material may be injected by the variable speed driven pump 245 and the static mixer 228, which results in a two stage process of scavenging hydrogen sulfide. In this embodiment, as less hydrogen sulfide is detected by the dissolved sulfide monitor 246, the variable speed driven pump 245 reduces the flow of hydrogen sulfide scavenger material. The speed of the variable speed driven pump 245, and thereby the rate at which scavenger material is injected into the process fluid, may be controlled by the hydrogen sulfide PLC 223*c*.

Once the hydrogen sulfide concentration of the process fluid has reached a predetermined concentration, the process fluid may be transferred or flowed to another module, for example, a process fluid storage module 331 or an oil removal and flocculation module 441 (both described in further detail below with reference to FIGS. 4 and 5, respectively). In one embodiment, a transfer pump 230, for example, a low shear rotary pump, may be coupled to the neutralizing compartment 214 and may transfer the process fluid to the process fluid storage module 331. In this embodiment, the hydrogen sulfide PLC 342 (FIG. 4) may control or regulate the pump operation. In one embodiment, a valve arrangement 232 may be coupled to piping between the neutralizing compartment 214 and the process fluid storage module 331 that diverts process fluid back at 233 to the neutralizing compartment 214 to regulate the flow of process fluid to the process fluid storage module 331 and further downstream. In one embodiment, the process fluid flow between the neutralizing module 214 and the process fluid storage module 331 may be maintained at a rate of about 210 gpm. In one embodiment, the transfer pump 230 may be coupled with the degassing compartment 213 of the degassing and neutralizing module 211 to remove the process fluid from the degassing compartment 213.

Process Fluid Storage Module

FIG. 4 shows one embodiment of a process fluid storage module 331. In the embodiment shown, the process fluid storage module 331 comprises a process fluid storage tank 332 configured to store process fluid. In one embodiment, process fluid from a previous module, such as from the degassing and neutralizing module 211, with a measured hydrogen sulfide content above a predetermined value may be stored in the process fluid storage module 331. In this embodiment, the process fluid stored in the process fluid storage module 331 may then be returned to a previous module, such as the degassing and neutralizing module 211, for re-treatment. In one embodiment, a transfer pump 336, 340 coupled to the process fluid storage module 331 may transfer stored process fluid to another module for example, a degassing and neutralizing module 211 or an oil removal and flocculation module 441. A sensor 338 disposed in the process fluid storage tank 332 monitors the level of process fluid contained in the process fluid storage module 331. The process fluid storage module 331 further comprises an air receiver 337 that receives air from the ventilation module 1110 (see FIG. 12) and maintains sufficient volumes of air for performing the system operation.

In one embodiment, a transfer pump 340, for example, a low shear rotary pump, transfers process fluid with a hydrogen sulfide content below a pre-selected value from the degassing and neutralizing module 211 (FIG. 3) to another module, for example, an oil removal and flocculation module 441 (as described in more detail below with reference to FIG. 5) for further treatment. Alternatively, the transfer pump may transfer process fluid with a hydrogen sulfide content below a pre-selected value from the degassing and neutralizing module 211 to the process fluid storage tank 332 for storage. In one embodiment, the pre-selected value may be about 5 ppm. One of ordinary skill in the art will appreciate that the pre-selected value may be selected by a client, environmental regulations, or requirements of the system. In one embodiment, the process fluid storage tank 332 may have a volume of approximately five hundred cubit feet (about 15 m$^3$). The transfer of fluids from the degassing and neutralizing module 211 to the process fluid storage module 331 or an oil removal and flocculation module 441 may be controlled by a hydrogen sulfide PLC 342. The process fluid stored in the process fluid storage module 331 may then be returned by a transfer pump 336 to the degassing and neutralizing module 211 for re-treatment, thereby reducing the concentration of hydrogen sulfide in the process fluid. The transfer pump 336 for returning process fluid from the process fluid storage module 331 to the degassing and neutralizing module 211, may be, for example, a low shear rotary pump.

The process fluid storage module 331 may be ventilated by purging the air within the module prior to operation (such as ten minutes prior). In one embodiment, ventilation air may be supplied to the process fluid storage module 331 from the ventilation module 1110 at a rate of up to twelve air changes or more per hour. In one embodiment, ventilation air may be extracted from the process fluid storage module 331 up to 20 percent or more above the supply rate. The process fluid storage tank 332 may be ventilated up to 20 times per hour or more. The ventilated air may be extracted by a blower 344 and vented through another module, for example, a sulfide treatment module 991, wherein hydrogen sulfide may be removed from the extracted gas. In the event of an Emergency Shut Down (ESD), isolation dampeners 346 may close, thereby preventing ventilation air from entering or exiting the process fluid storage module 331.

Oil Removal & Flocculation

Figure 5:
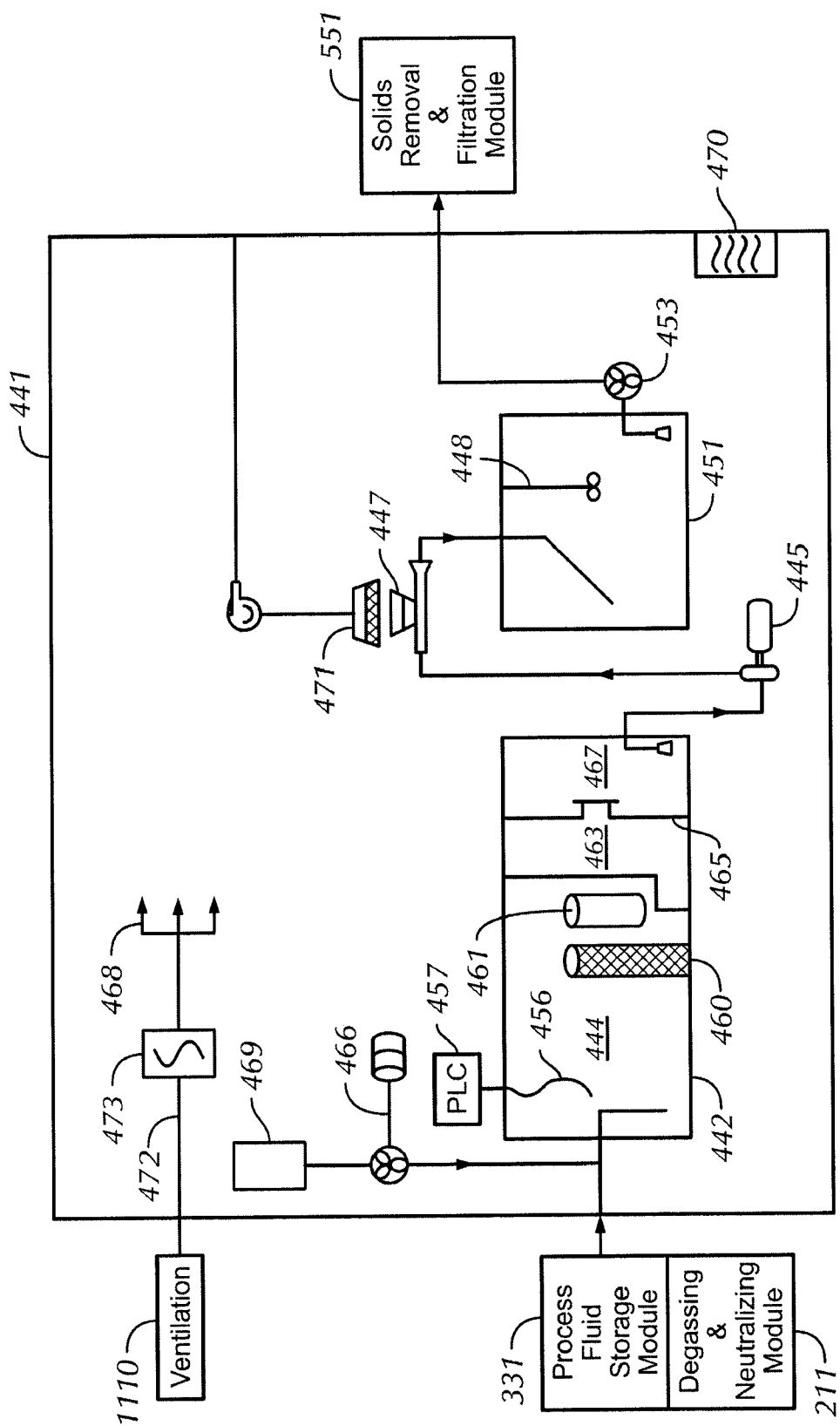
FIG. 5 shows an oil removal and flocculation module in accordance with an embodiment of the invention.

FIG. 5 shows one embodiment of an oil removal and flocculation module 441. In the embodiment shown, the oil removal and flocculation module 441 comprises a coalescing tank 442 for the removal of oil from a process fluid and a flocculation tank 451 for process fluid flocculation. In one embodiment, the process fluid may be process fluid from a previous module, for example the process fluid storage module 331 or the degassing and neutralizing module 211. In one embodiment, the coalescing tank 442 may comprise at least one level sensor 456 that measures the level or volume of process fluid in the coalescing tank 442. Additionally, the coalescing tank 442 may further comprise a pump for adding emulsion breakers to the process fluid and at least one filter for reducing oil in the process fluid. In this embodiment, a pump 445 may transfer the process fluid from the coalescing tank 442 through a hopper 447 and into the flocculation tank 451. In one embodiment, flocculating chemicals may be added to the process fluid in the hopper 447. In one embodiment, a transfer pump 453 may be coupled with the flocculation tank 451 for transferring process fluid to another module, for example the solids removal and filtration module 551. While the oil removal and flocculation processes described herein are disposed in one module, the oil removal and flocculation module 441, one of ordinary skill in the art will appreciate that these two processes may be disposed in separate modules, for example, the coalescing tank 442 may be disposed in one module, the flocculation tank in a second module, and the hopper in a third module, so long as each module is sufficiently small to be mobile and each module may be connected to another module for assembly on-site.

In one embodiment, process fluid from another module, for example, the degassing and neutralizing module 211 or the process fluid storage module 331, may be transferred via a pump 453, for example, a low shear rotary pump, into an oil removal and flocculation module 551. In this embodiment, the process fluid enters a first compartment 444 of a coalescing tank 442 having three compartments. A level sensor 456 coupled to the coalescing tank 442 measures the level of process fluid contained in the coalescing tank 442. The level sensor 456 may be coupled to a hydrogen sulfide PLC 457 to control the pump operation 340 (FIG. 4) in accordance with the measured process fluid level in the coalescing tank 442. In one embodiment, the level sensor 456 may be a wire rope sensor disposed inside the first compartment 444 of the coalescing tank 442. In one embodiment, the coalescing tank 442 may have a volume of approximately two hundred cubic feet (about 6 m$^3$). Emulsion breakers 469 may be added to the process fluid by a pump 466 coupled to the coalescing tank 442 to facilitate oil removal from the process fluid. The process fluid may then flow over a coalescing filter 460 and a coalescing oil trap 461 that remove oil entrained in the process fluid and into a second compartment 463 of the coalescing tank 442. The process fluid in the second compartment 463 may then flow through a weir arrangement 465 into a third compartment 467 of the coalescing tank 442. Oil recovered from process fluid in the coalescing tank 442 may be transferred to an intermediate bulk container (IBC) for storage or piped directly to a client.

In one embodiment, process fluid from the coalescing tank 442 is pumped through a hopper 447 by a pump 445, for example, a centrifugal pump 445, and into the flocculation tank 451. In one embodiment, the flocculation tank 451 may be approximately one hundred forty cubic feet (about 4 m$^3$). As the process fluid is pumped through the hopper 447, flocculating chemicals, for example, bentonite, may be added and mixed with the process fluid. In one embodiment, the flocculating chemicals may be added manually. One of ordinary skill in the art will appreciate, however, that other methods of adding flocculating chemicals to the hopper 447 may be used without departing from the scope of the invention. The process fluid may then flow into the flocculation tank 451, wherein suspended particles in the process fluid aggregate, forming a floc or a mass of fine suspended particles. A mixer 448 or agitator may be disposed in the flocculating tank 451. In one embodiment, the treated process fluid from the oil removal and flocculation module 441 may be transferred to another module 441, for example, a solids removal and filtration module 551, by a transfer pump 453 for further processing.

In one embodiment, the oil removal and flocculation module 441 may be coupled to another module, for example a ventilation supply module 1110, that supplies ventilation supply air 468. In one embodiment, ventilation supply air 468 may be supplied to the oil removal and flocculation module 441 at a rate of up 24 air changes or more per hour and may be discharged from the module 441 through at least one louver 470, that may be fixed or variable. In one embodiment, the coalescing tank 442 may be separately vented to the outside in the event hydrogen sulfide is exported into the oil removal and flocculation module 441 through the process fluid. A dust extraction hood 471 and filter may be disposed above the hopper 447 to extract residual dust resulting from the addition of the flocculation chemicals to the hopper 447. In the event of ESD, the ventilation supply air 468 to the oil removal and flocculation module 441 may be stopped by isolation dampeners 473 coupled to conduit 472 through which the ventilation air 468 is supplied.

Solids Removal & Filtration Module

FIG. 6 shows one embodiment of a solids removal and filtration module 551. In the embodiment shown, the solids removal and filtration module 551 comprises a belt filter 553 coupled to a containment 550 for removing solid material from a process fluid coupled to a storage tank 554. In this embodiment, at one least filter canister may be coupled to the storage tank 554. In one embodiment, a plurality of filter canisters may be connected in series, wherein a first filter canister 556 is coupled to the storage tank 554. While the solids removal and filtration processes described herein are disposed in one module, the solids removal and filtration module 551, one of ordinary skill in the art will appreciate that these two processes may be disposed in separate modules, for example, the belt filter 554, containment 550, and storage tank 554 may be disposed in one module, and the plurality of filter canisters may be disposed in a second module, so long as each module is sufficiently small to be mobile and each module may be connected to another module for assembly on-site.

In one embodiment, a process fluid from another module, for example, the oil removal and flocculation module 441 (FIG. 5), may be pumped through a containment 550 coupled with a belt filter 553. In one embodiment, the belt filter 553 comprises a conveyor 540 having a filter medium 559. In one embodiment, the filter medium 559 may comprise polyester. One of ordinary skill in the art will appreciate, however, that a filter of any of a number of materials may be used so long as it filters out solid material from the process fluid. As the process fluid flows through the filter medium 559, solid materials 557 are removed from the process fluid and retained on the filter medium 559. As process fluid continues to flow through the filter medium 559, the solid materials retained on the filter medium 559 increases and may blind or clog the filter medium 559. Accordingly, the level of process fluid on the filter medium 559 increases due to a blockage of flow. A predetermined level of process fluid on the filter medium 559 may trigger a forward motion (indicated by arrow C) of the conveyor 540 and filter medium 559. In one embodiment, a sensor 558 may detect the level of process fluid on the filter medium 559. The filter medium 559 is conveyed out of the containment 550, removing the retained solid materials out of the solid materials removal and filtration module 551 for disposal 560. In one embodiment, a hydrogen sulfide PLC 542 may control movement of the conveyor 540 and filter medium. In one embodiment, the hydrogen sulfide PLC 542 may move the conveyor 540 and filter medium 559 forward until a predetermined flow rate of process fluid through the filter medium 559 is resumed, thereby reducing the fluid level on the filter medium 559. In one embodiment, a sensor 558 may detect the flow rate of the process fluid through the filter medium 559. In another embodiment, the sensor 558 that detects the level of process fluid on the filter medium 559 may signal the PLC 542 when the fluid level on the filter medium 559 has been reduced to the predetermined flow rate of process fluid through the filter medium 559.

The process fluid that flows through the filter medium 559 of the belt filter 553 may then flow into a storage tank 554. Once the process fluid reaches a predetermined height in the storage tank 554, the process fluid may be transferred by a pump 562, for example, by a centrifugal pump, to at least one filter canister wherein solids particles and hydrocarbons may be removed from the process fluid. Each of the at least one filter canister comprises a filter, for example a bag filter or a cartridge filter. In one embodiment, the process fluid is pumped to a first filter canister 556 of a series of three filter canisters, wherein the first filter 556 canister is coupled to a second filter canister 563 and the second filter 563 canister is coupled to a third filter canister 564. In this embodiment, a plurality of bag filters 565 may be disposed inside the first filter canister 556 to remove solid particles from the process fluid.

In one embodiment, three bag filters may be disposed in the first filter canister 556 that remove solid particles larger than about 20 microns from the process fluid. The process fluid may then flow through the first filter canister 556 and into the second canister 563. A plurality of filter cartridges 566 may be disposed inside the second filter canister 563 for removal of solid particles from the process fluid. In one embodiment, 28 filter cartridges may be disposed inside the second filter canister 563 that remove solid particles larger than about 10 microns from the process fluid. The process fluid may then flow from the second filter canister 563 to the third filter canister 564. A plurality of filter cartridges 566 may be disposed inside the third filter canister 564 for removal of hydrocarbons from the process fluid.

In one embodiment, 28 filter cartridges may disposed in the third filter canister 564 that remove hydrocarbon larger than about 10 microns. One of ordinary skill in the art will appreciate that the number of filter canisters, the number of filters within a filter canister, and the size of the particles removed by each filter may vary without departing from the scope of the invention. In one embodiment, differential pressure transducers 567 may be coupled to each filter canister to detect clogging of the filters. In this embodiment, the pressure transducer 567 may signal an operator if the filters become plugged so that the filters may be cleaned or replaced. After the process fluid has flowed through the filter canisters, the process fluid may be transferred to another module 568, for example a treated fluid storage module.

In one embodiment, the solids removal and filtration module 551 may be coupled to another module, for example a ventilation supply module 1110, that supplies ventilation supply air 569. In one embodiment, ventilation supply air 569 may be supplied to the solids removal and filtration module 551 at a rate of up to 24 air changes or more per hour and may be discharged from the module 551 through at least one louver 570, that may be fixed or variable. In the event of ESD, the ventilation supply air 569 to the solids removal and filtration module 551 may be stopped by isolation dampeners 574 coupled to conduit 572 through which the ventilation air 569 is supplied.

Treated Fluid Storage Module

Figure 7:
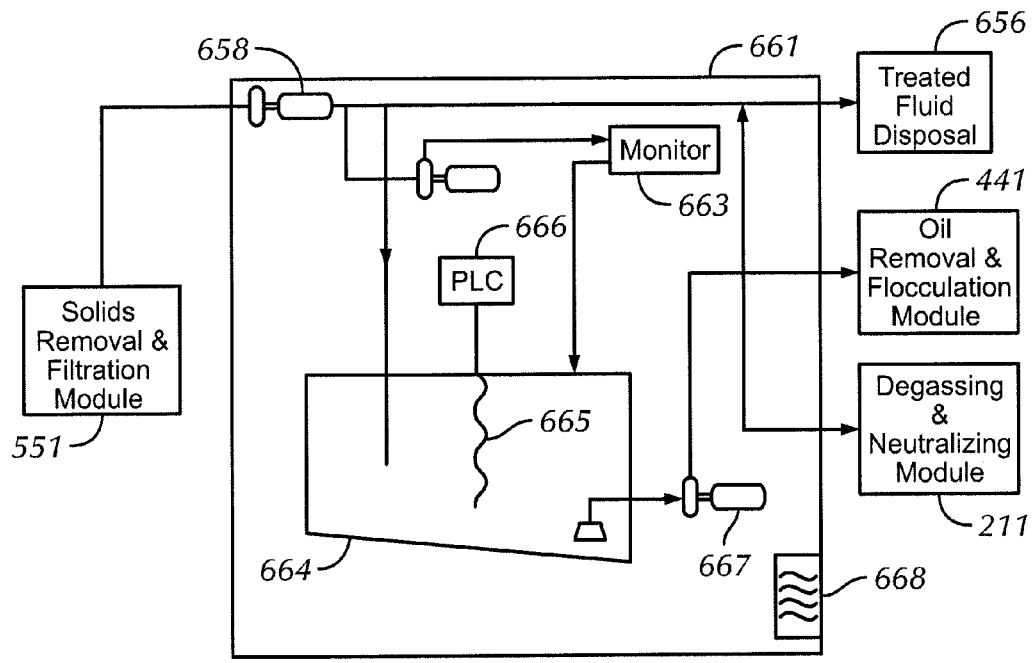
FIG. 7 shows a treated fluid storage module in accordance with an embodiment of the invention.

FIG. 7 shows one embodiment of a treated fluid storage module 661. The treated fluid storage module 661 may be configured to receive a treated process fluid from another module, for example, the solids removal and filtration module 551. In this embodiment, the treated fluid storage module 661 comprises an oil-in-water monitoring system 663 for measuring the concentration of oil within a treated process fluid entering the treated fluid storage module 661 from another the solids removal and filtration module 551. The treated fluid storage module 661 further comprises a tank 664 for storing the treated process fluid. In one embodiment, a level sensor 665 may be disposed in the storage tank 664 to measure the volume of fluid contained in the tank 664 and may signal a PLC 666 to shut off the transfer pump 658 that transfers the process fluid into the treated fluid storage module 661 when a predetermined volume of fluid is contained in the tank 664.

In one embodiment, a treated process fluid may be transferred from another module, for example, the solids removal and filtration module 551, into the treated fluid storage module 661. The treated process fluid may flow through an oil-in-water monitoring system 663, for example, a Rivertrace Engineering oil-in-water monitor (Calgary, Alberta, Canada), disposed in the treated process fluid module 661 that performs an inspection of the treated process fluid. The oil-in-water monitor 663 measures the content of oil within the treated process fluid. In one embodiment, treated process fluid having a concentration less than a predetermined value of oil may be transported outside the system for safe disposal 656. Treated process fluid having a concentration greater than the predetermined value of oil may be transported to tank 664 disposed in the treated fluid storage module 661 for storage. In one embodiment, the predetermined value of oil concentration in the process fluid is about 40 ppm. In one embodiment, the tank 664 may have a volume of approximately nine hundred cubic feet (about 26 m$^3$). The treated process fluid contained in the tank 664 may be stored for a predetermined amount of time. In one embodiment, the process fluid may be stored for thirty minutes. The treated process fluid contained in the tank 664, that is, treated process fluid having more than 40 ppm of oil, may be pumped from the tank to another module for further processing. In one embodiment, the treated process fluid contained in the tank may be pumped back 667 to the degassing and neutralizing module 211 (FIG. 3) for further processing or tank cleaning. In another embodiment, the treated process fluid may be pumped from the tank 664 back to the oil removal and flocculation module 441 (FIG. 5) for further oil removal and flocculation.

In one embodiment, the treated fluid storage module 661 may further comprise at least one louver 668, that may be fixed or variable, disposed proximate a pump end of the treated fluid storage module 661 for cooling a pump motor. The treated fluid storage module 661 may be unmanned and may operate in a Zone 1 area.

Local Electric Room Module

FIG. 8 shows one embodiment of a local electric room module 771. In the embodiment shown, the local electric room module 771 comprises a plurality of systems that may control different aspects of the connected modular system for treating a process fluid. In one embodiment, the local electric room module 771 may be electrically connected 40, 41 (FIG. 1) to PLCs, pumps, valves, aeration devices, blowers, and other adjustment mechanisms disposed in any one of the various modules. In one embodiment, the local electric room module 771 may comprise a hydrogen sulfide PLC system 773, a Fire and Gas detection and Emergency Shut Down (F&G/ESD) system 774, and a Motor Control Center (MCC) 775.

In one embodiment, a hydrogen sulfide PLC system 773 may be disposed in the local electric room module 771 that operatively controls a plurality of processes of the modular system for treating a process fluid. For example, the hydrogen sulfide PLC system 773 may be provided by Coral Engineering. The hydrogen sulfide PLC 773 system may interface with a plurality of field sensors, the MCC 775, and/or the F&G/ESD system 774. In one embodiment, an operator interface, or Human Machine Interface 882 (HMI), may be located in a control room module 881, as described in more detail below with reference to FIG. 9. The HMI 882 may allow an operator to monitor and control the hydrogen sulfide PLC 773.

In one embodiment, a F&G/ESD system 774 may be disposed in the local electric room module 771 and may shut down the modular system in a safe manner in the event a serious process condition, for example a fire or gas leak, occurs. For example, the F&G/ESD system 774 may be provided by, for example, ICS Triplex, In one embodiment, the F&G/ESD system 774 may be rated as a Safety Integrity Level (SIL) 3. The F&G/ESD system may interface with a plurality of field sensors to determine the process conditions of the modular system. In one embodiment, signals from the F&G/ESD system may be displayed on the hydrogen sulfide PLC HMI 882 to facilitate diagnostics of the modular system.

In one embodiment, a MCC 775 may be disposed in the local electric room module 771 and may control and monitor the motor power for the modular system. For example, the MCC 775 may be provided by, for example, Aker Elektro. Starters in the MCC system may communicate with the hydrogen sulfide PLC.

In one embodiment, ventilation for the local electric room module 771 may be provided by air 762 drawn in from outside the module to maintain an overpressure within the module. Ventilation supply air 762 may be supplied to the local electric room module 771 at a rate of up to 6 air changes or more per hour. The local electric room module 771 may be equipped with heating and air conditioning to maintain desired ventilation. A sensor 760 may be disposed in the local electric room module 771 that detects hydrogen sulfide and other gases in the ventilation air 762. In the event the sensor detects hydrogen sulfide or gases in the ventilation air 762, the ventilation will shut down. Isolation dampeners 764 may seal the module from further gas intrusion. The local electric room module 771 may be certified for Zone 1 IIB T2 operations.

Control Room Module

Figure 9:
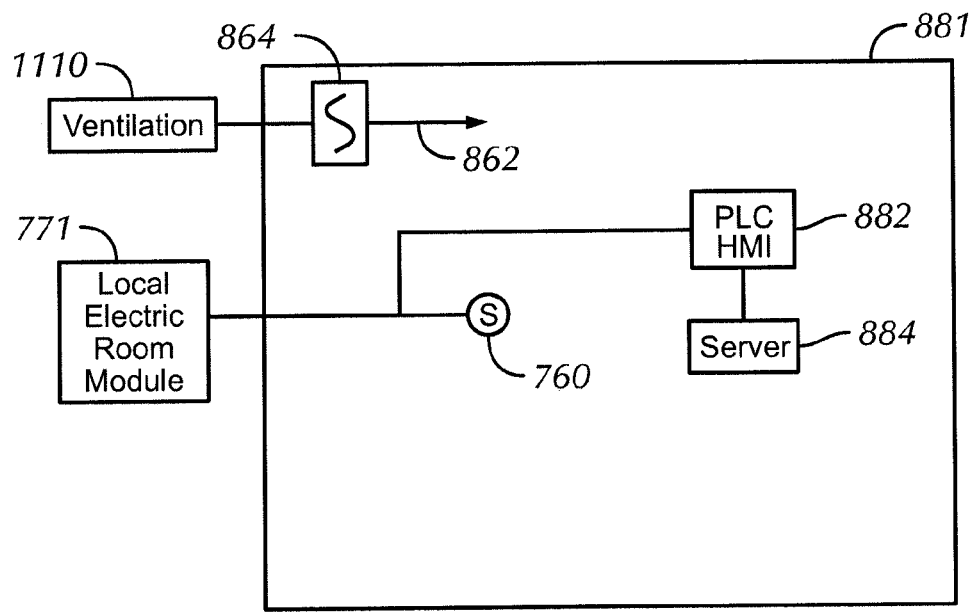
FIG. 9 shows a control room module in accordance with an embodiment of the invention.

FIG. 9 shows one embodiment of a control room module 881. In the embodiment shown, the control room module 881 comprises an operator work station and a system laboratory. In one embodiment, the control room may be electrically connected 43 (FIG. 1) to at least one of the systems, including the hydrogen sulfide PLC system 773, the F&G/ESD system 774, and the MCC 775, disposed in the local electric room module 771. In one embodiment, the control room module 881 may be disposed on top of the local electric room module 771 (FIG. 8).

In one embodiment, a hydrogen sulfide PLC HMI 882 may be disposed in the control room module 881. The hydrogen sulfide PLC HMI 882 provides an operator a graphical interface of the process in a process and instrumentation diagram (P&ID) format. An example PLC HMI may be provided by, for example, Coral Engineering.

Further, a hydrogen sulfide PLC server 884 may be disposed in the control room module 881 that manages the modular system. In one embodiment, the hydrogen sulfide PLC server 884 may be provided by, for example, Coral Engineering. In one embodiment, the PLC server may comprise a software system that facilitates management of the processes of the modular system. For example, the hydrogen sulfide PLC server may comprise a supervisory control and data acquisition (SCADA) package system that operates on Cimplicity®, Plant Edition.

In one embodiment, ventilation for the control room module 881 may be provided by air 862 drawn in from outside the module to maintain an overpressure within the module. In one embodiment, ventilation supply air 862 may be supplied to the control room module 881 at a rate of up to 6 air changes or more per hour. The control room module 881 may be equipped with heating and air conditioning to maintain desired ventilation. A sensor 760 may be disposed in the control room module 881 that detects hydrogen sulfide and other gases in the ventilation air 862. In the event the sensor 760 detects hydrogen sulfide or gases in the ventilation air 862, the ventilation will shut down. Isolation dampeners 864 may seal the module from further gas intrusion. The control room module 881 may be certified for Zone 1 IIB T2 operations.

Sulfide Treatment Module

FIG. 10 shows one embodiment of a sulfide treatment module 991. In the embodiment shown, the sulfide treatment module 991 comprises a system for removing hydrogen sulfide gas from ventilation air from, for example, the mechanical degasser, the degassing compartment of the degassing and neutralizing module, the neutralizing compartment of the degassing and neutralizing module, and/or the process fluid storage module, herein collectively referred to as 'sour gas' 992. The sulfide treatment module 991 comprises a tank 994 for containing a gas. In one embodiment, the tank 994 may have an approximate volume of twelve hundred cubic feet (about 35 m$^3$).

In one embodiment, the sulfide treatment module 991 comprises a consumable medium 986 that chemically reacts with the sour gas 992, thereby reducing the amount of hydrogen sulfide in the sour gas 992. In one embodiment the consumable medium 986 capacity of the tank 994 is approximately 20 ton. For example, a SulfaTreat® (M-I, L.L.C., Houston, Tex.) hydrogen sulfide treatment system may be disposed within the sulfide treatment module 991. In this embodiment, the hydrogen sulfide treatment system process provides a chemical reaction that reduces the hydrogen sulfide in the sour gas 992 with a specifically designed consumable medium 986. SulfaTreat® is a consumable medium that may convert hydrogen sulfide into a safe material for disposal while allowing other gases to pass through. One of ordinary skill in the art will appreciate that any material known in the art that reduces the amount of hydrogen sulfide in a gas stream may be used without departing from the scope of the invention.

In the embodiment shown in FIG. 10, sour gas 992 flows through a consistently sized and shaped granular consumable medium 986 in a fixed-bed or batch-type granular hydrogen sulfide reactant contained in a pressure vessel or tank 994. A potable water misting system 993 may be provided within the module 991 to moisten the consumable medium 986 for operation. As the sour gas 992 flows through the consumable medium 986, hydrogen sulfide reacts with the consumable medium 986 to form a stable and safe byproduct. Once the consumable medium 986 is at least partially consumed, the misting system 993 may be used to cool the consumable medium 986 for removal. In one embodiment, a gas, for example, methane, may result from the hydrogen sulfide treatment system process. After hydrogen sulfide has been removed from the sour gas 992, the hydrogen-sulfide-reduced gas may be extracted to the burner line module 1020 and delivered to a burner line 1030 (FIG. 11) for flaring.

Burner Line Module

FIG. 11 shows one embodiment of a burner line module 1020. In the embodiment shown, the burner line module 1020 is provided to extract gases from the sulfide treatment module 991 and to deliver the gases to at least one burner 1030. In one embodiment, the at least one burner 1030 may be disposed at a location distant from the modular system. In one embodiment, the at least one burner 1030 may be located as far as 425 ft away.

In one embodiment, the burner line module 1020 comprises a hydrogen sulfide gas detection system 1025, a particulate filter 1022, a detonation arrestor 1024, a rupture disc 1026, and a centrifugal blower 1028 coupled to a motor 1027. The hydrogen sulfide gas detection system 1025 may be installed in the burner line module 1020 to measure and monitor the amount of hydrogen sulfide gas present in the gas stream. The hydrogen sulfide gas detection system 1025 may be coupled to F&G/ESD system so that, in the event the amount of hydrogen sulfide gas present in the gas stream is above a predetermined value, the hydrogen gas detection system 1025 may shut down the burner line module. The detonation arrestor may 1024 be installed in the burner line module 1020 with temperature sensors and an ESD valve to shut down the modular system in the event a flame travels up the burner line 1032. In the event the detonation arrestor 1024 becomes plugged and an overpressure situation arises in the sulfide treatment module 991, a rupture disc 1026 allows this system, or burner line module 1120, to be bypassed and gas flow from the sulfide treatment module 991 may be sent directly to a burner 1030.

In one embodiment, the blower and motor may be enclosed to limit noise output. The burner line module 1020 may be covered, but open on the sides to ventilate the burner line module 1020.

Ventilation Supply Module

FIG. 12 shows one embodiment of a ventilation supply module 1110 that supplies ventilation to any one of the other modules in the modular system. In one embodiments, the ventilation supply module comprises isolation dampeners 1124, an air heater 1112, a coalescing filter 1114, and at least one blower 1116.

In one embodiment, ventilation supply air 1103 may be ducted in from outside the module. In one embodiment, the ventilation supply air 1103 may be ducted 1118 from an elevation above the control room module 881 (FIG. 9). For example, the ventilation supply air 1103, may be ducted from a approximately 30 feet above the ground. The ventilation supply air 1103 may then pass through the air heater 1112 and a coalescing filter 1114, thereafter forming two separate air supply systems. A first air system 1120 may deliver supply air via insulated ducting to the degassing and neutralizing module 211 (FIG. 3) and the process fluid storage module 331 (FIG. 4). A second air system 1122 may deliver supply air via ducting to the oil removal and flocculation module 441 (FIG. 4) and the solids removal and filtration module 551 (FIG. 6). Each air system has an axial blower 1116 to power the ventilation supply air. In the event of an ESD, isolation dampeners 1124 will close preventing air supply from entering other process modules.

In one embodiment, the ventilation supply module may comprise a cover or lid, however, may be open on the sides allowing ventilation of the ventilation supply module.

Piping Suitcase

In one embodiment, a piping suitcase 28, shown in FIG. 1, may be provided that allows easy connection of piping for the system utilities and module interconnection. In one embodiment, the piping suitcase 28 may include a plurality of pipes, connections, and inline process equipment that allows a module to be coupled to another module by coupling each module to the piping suitcase 28. For example, as shown in FIG. 1, the treated fluid storage module 661 and the degassing and neutralizing module 211 may be coupled to the piping suitcase 28, allowing fluid communication between the two modules 661, 211 shown at 34. One of ordinary skill in the art will appreciate that the piping suitcase may be configured to couple any of the modules together. Additionally, one of ordinary skill in the art will appreciate that the piping suitcase may be configured to couple a module with a plurality of modules.

Materials

Tanks disposed in any one of the modules above that may be exposed to corrosive process fluids may be constructed of any material known in that art that will withstand corrosive process fluids. In one embodiment, the tanks exposed to corrosive process fluids may be constructed of stainless steel, for example, grade 316L SS. Inline process equipment, sensors, valves, piping, flanges, etc. that may be exposed to corrosive process fluids may also be constructed of stainless steel, for example grade 316L SS. Elastomeric materials for hoses and seals may be selected so as to be chemical and hydrocarbon resistant.

Embodiments of the invention may include one or more of the following advantages. Embodiments of the invention provide a process fluid treatment system that comprises various modules sized so that they are sufficiently small to mobile. Embodiments of the invention provide a modular system that may be assembled on-site for the treatment of process fluids. Embodiments of the invention provide a method for treating process fluids to reduce the amount of contaminants from the process fluid, including solids, gases, such as hydrogen sulfide, and oil.

Wile the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of treating a process fluid, the method comprising:

assembling a modular system;

flowing the process fluid through the modular system, the flowing the process fluid through the modular system comprising:

degassing the process fluid, neutralizing the process fluid, and reducing an amount of one of the group consisting of entrained gases, oil, and solids in the process fluid in a first module;

reducing further an amount of one of a group consisting of oil and solids in the degassed and neutralized process fluid in a second module, wherein the second module is in fluid communication with the first module;

monitoring and analyzing the process fluid for at least one of the group consisting of entrained gases, oil, and solids; and flowing the process fluid out of the modular system for disposal.

2. The method of claim 1, wherein the flowing a process fluid through the modular system further comprises reducing an amount of solids and gas, wherein the reducing an amount of solids and gas comprises:

flowing the process fluid into a tank;

flowing the process fluid over separation baffles disposed inside the tank;

injecting hydrogen sulfide scavenger material into the process fluid in the tank; and flowing the process fluid over a weir arrangement disposed inside the tank.

3. The method of claim 1, wherein the degassing a process fluid comprises:

flowing the process fluid into a degassing compartment; and running a degasser in the degassing compartment.

4. The method of claim 3, further comprising aerating the process fluid in the degassing compartment.

5. The method of claim 1, wherein the neutralizing a process fluid comprises:

flowing the process fluid into a neutralizing compartment;

sampling and analyzing the process fluid in the neutralizing compartment to measure the concentration of hydrogen sulfide in the process fluid;

monitoring the pH of the process fluid in the neutralizing compartment; and adjusting the pH of the process fluid in the neutralizing compartment.

6. The method of claim 1, wherein the degassing a process fluid and the neutralizing a process fluid comprises:

flowing the process fluid into a degassing compartment;

running a degasser in the degassing compartment;

flowing the process fluid over a weir arrangement from the degassing compartment into a neutralizing compartment;

sampling and analyzing the process fluid in the neutralizing compartment to measure the concentration of hydrogen sulfide in the process fluid;

monitoring the pH of the process fluid in the neutralizing compartment; and adjusting the pH of the process fluid in the neutralizing compartment.

7. The method of claim 1, wherein the reducing an amount of oil in the process fluid comprises:

adding emulsion breakers to the process fluid;

flowing process fluid into a first compartment of a coalescing tank;

flowing the process fluid through a coalescing filter and a floating oil skimmer into a second compartment of the coalescing tank;

flowing the process fluid through a weir arrangement from the second compartment to the third compartment of the coalescing tank;

flowing the process fluid through a hopper and therein adding flocculating chemicals to the process fluid; and flowing the process fluid from the hopper into a flocculation tank.

8. The method of claim 1, wherein the reducing an amount of solids in the process fluid comprises:

flowing the process fluid through a filter medium of a belt filter;

filling a storage tank with the process fluid flowed through the filter medium to a predetermined height; and flowing the process fluid through at least one filter canister, wherein the process fluid is flowed through a plurality of filters disposed within each filter canister.

9. The method of claim 1, wherein the monitoring and analyzing the process fluid comprises:

sampling the process fluid; and measuring a concentration of at least one of the group consisting of entrained gases, oil, and solids of the sampled process fluid.

10. The method of claim 1, further comprising storing a treated process fluid, wherein storing a treated process fluid comprises:

flowing the process fluid through a monitoring system;

measuring the concentration of oil in the process fluid;

flowing the process fluid with an oil concentration above a predetermined value into a tank; and disposing of the process fluid with an oil concentration below a predetermined value.

11. The method of claim 1, further comprising ventilating the modular system, the ventilating comprising:

ducting air into a module for ventilation supply;

flowing ventilation supply air through an air heater and a coalescing filter disposed in the module for ventilation supply; and delivering ventilation supply air via ducting to at least one module of the modular system.

12. The method of claim 1, further comprising reducing the amount of hydrogen sulfide gas from a sour gas, the reducing the amount of hydrogen sulfide gas comprising:

providing a consumable medium in a tank disposed in a module for sulfide treatment;

misting the consumable medium with water; and flowing sour gas from any one of the modules of the modular system into the tank in the module for sulfide treatment, wherein the sour gas chemically reacts with the consumable medium, thereby reducing the amount of hydrogen sulfide in the sour gas.

13. The method of claim 12, further comprising extracting a gas from the modular system, the extracting a gas from the modular system comprising:

extracting a gas from the module for sulfide treatment;

flowing the gas through a particulate filter; and delivering the gas to a burner.

* * * * *